United States Patent [19]
Symons

[11] Patent Number: 5,879,600
[45] Date of Patent: Mar. 9, 1999

[54] METHOD OF PREPARING AN EXFOLIATED VERMICULITE FOR THE MANUFACTURE OF FINISHED PRODUCT

[75] Inventor: Michael Windsor Symons, Pretoria, South Africa

[73] Assignee: Tower Technologies Proprietary Limited, Pretoria, South Africa

[21] Appl. No.: 849,009

[22] Filed: Jul. 28, 1997

[30] Foreign Application Priority Data

| | | | |
|---|---|---|---|
| Oct. 31, 1994 | [ZA] | South Africa | 94/8554 |
| Nov. 10, 1994 | [ZA] | South Africa | 94/8917 |
| Apr. 7, 1995 | [ZA] | South Africa | 95/2890 |
| Aug. 10, 1995 | [ZA] | South Africa | 95/6664 |
| Dec. 13, 1995 | [ZA] | South Africa | 94/9910 |

[51] Int. Cl.$^6$ .............................. B29C 67/24; B05D 3/06
[52] U.S. Cl. .................... 264/110; 264/112; 264/123; 427/496; 427/533; 427/536; 427/539; 427/551; 427/553; 427/407.1; 427/221; 252/378 R; 423/327.1; 423/331
[58] Field of Search ..................................... 427/533, 536, 427/539, 551, 553, 496, 407.1, 221; 264/109, 110, 112, 113, 123; 252/378 R; 423/324–334

[56] References Cited

U.S. PATENT DOCUMENTS

| | | | |
|---|---|---|---|
| 2,397,083 | 3/1946 | Bellamy . | |
| 4,410,586 | 10/1983 | Ladizesky et al. | 428/245 |
| 5,309,690 | 5/1994 | Symons | 52/309.9 |
| 5,466,424 | 11/1995 | Kusano et al. | 427/569 |

*Primary Examiner*—Erma Cameron
*Attorney, Agent, or Firm*—Pillsbury Madison & Sutro LLP

[57] ABSTRACT

A method of preparing particles of an exfoliated vermiculite for the manufacture of a finished product, such as a particle board, includes the steps of, if necessary, chemically modifying the vermiculite by impregnating the vermiculite with a suitable anhydride in a non-aqueous solvent; if necessary, applying to the particles of vermiculite an adhesion promoter to promote the adherence of a resin to the surfaces of the particles of vermiculite; and resinating the particles of vermiculite either with a thermoplastic resin which has been surface modified by irradiation or by fluorination, or by an isocyanate thermosetting resin, or by a dry powder novolac thermosetting resin; and if necessary removing any solvent present.

21 Claims, No Drawings

METHOD OF PREPARING AN EXFOLIATED VERMICULITE FOR THE MANUFACTURE OF FINISHED PRODUCT

BACKGROUND OF THE INVENTION

This invention relates to a method of preparing particles of an exfoliated vermiculite for the manufacture of a finished product and to a method of making a finished product from the particles of exfoliated vermiculite.

SUMMARY OF THE INVENTION

According to a first aspect of the invention there is provided a method of preparing particles of an exfoliated vermiculite for the manufacture of a finished product which method includes the steps of:

(a) if necessary chemically modifying the vermiculite by impregnating the vermiculite with an impregnating composition comprising a dicarboxylic anhydride or a tricarboxylic anhydride dissolved in a suitable non-aqueous solvent;

(b) if necessary applying to the particles an adhesion promoter to promote the adherence of a resin to the surfaces of the particles of vermiculite;

(c) resinating the particles of vermiculite by either:
  (i) applying to the particles a thermoplastic resin in dry powder form, so that after the application of the adhesion promoter, the thermoplastic resin adheres to the surfaces of the particles of vermiculite, the thermoplastic resin having been surface modified by irradiation or by fluorination; or
  (ii) including in the impregnating composition of step (a) an isocyanate thermosetting resin dissolved in a suitable compatible solvent; or
  (iii) applying to the particles a dry powder novolac thermosetting resin and if necessary a catalyst therefor so that after the application of the adhesion promoter, the dry powder novolac thermosetting resin adheres to the surfaces of the particles of vermiculite; and (d) if necessary after step (c), removing any solvent present.

In a first alternative, the method includes the steps of:

(a) chemically modifying the vermiculite by impregnating the vermiculite with an impregnating composition comprising a dicarboxylic anhydride or a tricarboxylic anhydride dissolved in a suitable non-aqueous solvent;

(c) (ii) resinating the particles of vermiculite by including in the impregnating composition of step (a) an isocyanate thermosetting resin dissolved in a suitable compatible solvent; and (d) after step (c) (ii), removing the solvent.

In this case, no adhesion promoter is necessary.

The dicarboxylic anhydride may be selected from the group consisting of maleic anhydride, phthalic anhydride, succinic anhydride and tetrahydrophthalic anhydride, and the tricarboxylic anhydride may be trimellitic anhydride. Suitable solvents include methyl acetate, ethyl acetate, methylethyl ketone, benzene, trichloroethylene and dichloromethane, preferably dichloromethane.

The impregnating composition preferably contains from 0,25% to 20% inclusive, more preferably from 0,25% to 10% inclusive of the anhydride by weight of the impregnating composition.

As the vermiculite preferably takes up from 20% to 250% inclusive, more preferably from 30% to 150% inclusive of the impregnating composition by weight of the vermiculite before removal of the solvent, after removal of the solvent the amount of the anhydride in the vermiculite thus ranges from 0,05% to 50% inclusive by weight of the vermiculite.

The solvent for the isocyanate resin is preferably the same as the solvent for the impregnating composition, but may be a different compatible solvent.

The impregnating composition preferably contains the isocyanate thermosetting resin in an amount of from 0,25% to 50% inclusive of the isocyanate thermosetting resin by weight of the impregnating composition.

In a second alternative, the method includes the steps of:

(b) applying to the particles an adhesion promoter to promote the adherence of a resin to the surfaces of the particles of vermiculite;

(c) (i) applying to the particles a thermoplastic resin in dry powder form, so that after the application of the adhesion promoter, the thermoplastic adheres to the surfaces of the particles of vermiculite, the thermosetting resin having been surface modified by irradiation or by fluorination; and (d) if necessary after step (c), removing any solvent present.

Step (c) (i) may precede or follow step (b).

In this case, no chemical modification of the vermiculite is required. The adhesion promoter may be applied with or without a solvent therefor.

The adhesion promoter is preferably selected from the group consisting of convertible resins such as petroleum resins, hydrocarbon resins and coumarone indene resins; thermoplastic rubbers; styrene butadiene resins; styrene acrylate resins; chlorinated rubbers; phenolic resins; solvent soluble thermoplastic resins such as polystyrene or polyvinyl chloride; lignocellulosic derived gums or rosins; solvent swellable celluloses such as methylhydroxypropylcellulose; phenol formaldehyde novolac resins; urethane elastomers; resinous tackifiers; bitumen; coal tar; asphalt and pitch; if necessary dissolved in a suitable non-aqueous solvent such as those listed above for the anhydrides.

In the second alternative, the adhesion promoter may be one used in the water phase, such as those selected from the group comprising water soluble, dispersible or miscible polymers, which are stable to electrolytes with film forming temperatures between minus 15° C. and 40° C., including polyvinyl alcohol, polyurethanes, olefins, acrylate vinyl esters, polyvinyl halides, chloroprene copolymers, and dispersions of styrene butadiene rubber, butadiene vinyl acetate copolymers and polyacrylic acid esters, acrylics and the acrylic pressure sensitives.

The adhesion promoter is preferably applied to the particles in an amount of from 0,1% to 25% inclusive of the adhesion promoter by weight of the particles of vermiculite.

The thermoplastic resin preferably comprises an irradiated cross-linkable thermoplastic resin in dry powder form, preferably finely divided dry powder form, which resin has been subjected to gamma irradiation whilst in dry powder form, the resin being selected from the group consisting of polyvinyl chloride, linear low density polyethylene, low density polyethylene and high density polyethylene, or a thermoplastic resin in dry powder form, preferably finely divided dry powder form, which has been fluorinated, the resin being selected from the group consisting of polyvinyl chloride, polyethylene and polypropylene.

In step (c) (i), the particles of vermiculite are resinated with from 1% to 500% inclusive of the thermoplastic resin by weight of the vermiculite. Where the particles of vermiculite are destined for an extrusion or injection moulding process, then the particles are preferably resinated with from 50% to 500% inclusive of the thermoplastic resin by weight of the vermiculite. However, where the particles are destined for a compression moulding process, e.g. the manufacture of a particle board, then the particles are preferably resinated with from 2% to 50% inclusive of the thermoplastic resin by weight of the vermiculite.

As a further alternative, the adhesion promoter may be applied to the particles of thermoplastic resin before step (c) (i).

In a third alternative, the method includes the steps of:
(b) applying to the particles an adhesion promoter which comprises a solvent which wets the particles of vermiculite and which causes adherence of a resin to the surfaces of the particles of vermiculite;
(c) (iii) applying to the particles a dry powder novolac thermosetting resin and if necessary a catalyst therefor so that after the application of the adhesion promoter, the dry powder novolac thermosetting resin adheres to the surfaces of the particles of vermiculite; and
(d) after step (c) removing the solvent.

Step (c) (iii) may precede or follow step (b).

The solvent may be selected from the group consisting of water or dichloromethane.

There may also be incorporated with the vermiculite particles suitable reinforcing fibres.

In addition, the particles of vermiculite may be mixed with a suitable amount of cryogenically ground crumb rubber particles, such as those recovered from automobile tires, in the range of particle sizes from 0,25 to 3 mm inclusive, to improve the resilience, shock resistance, nail holding ability and flexibility of the finished product made therefrom.

According to a second aspect of the invention there is provided a process of making an article from particles of an exfoliated vermiculite treated by steps (a), (b), (c) and (d) above, which process includes the step of:
(1) compressing the particles of vermiculite with heating in a suitable press or mould to allow the resin present to polymerise to form the article.

For example, the particles of vermiculite may be compressed and heated in a suitable press or mould at temperatures between 120° C. and 250° C. inclusive, preferably from 130° C. to 220° C. inclusive, and pressures of from 2 to 70 kg/cm² inclusive.

The article may be for example a particle board.

According to a third aspect of the invention, there is provided a process of making a particle board from particles of an exfoliated vermiculite treated by steps (a), (b), (c) and (d) above, which process includes the steps of:
(i) impregnating a sheet or sheets of a lignocellulosic material with a composition comprising a thermosetting resin, an extending liquid for the thermosetting resin and where necessary a catalyst for the thermosetting resin;
(ii) recovering the extending liquid;
(iii) placing on one or both sides of a layer of the particles of vermiculite, the impregnated sheet or sheets of lignocellulosic material to form a composite; and
(iv) compressing the composite with heating in a suitable press to allow the resin present to polymerise, and to allow the thermosetting resin in the impregnated sheet or sheets to polymerise and to bond, and all to set to form the particle board.

Again, for example, the composite may be compressed and heated in a suitable press at temperatures between 120° C. and 250° C. inclusive, preferably from 130° C. to 200° C. inclusive, and at pressures of from 2 to 70 kg/cm² inclusive.

According to a fourth aspect of the invention there is provided a process of making an article from particles of an exfoliated vermiculite treated by steps (a), (b), (c) and (d) above, which process includes the step of:
(I) subjecting the particles of vermiculite to an extrusion or injection moulding process with heating to allow the resin present to polymerise to form the article.

DESCRIPTION OF EMBODIMENTS

The first aspect of the invention is a method of preparing particles of a exfoliated vermiculite for the manufacture of a finished product.

Vermiculite is the geological name for a group of hydrated lamina minerals which are aluminium iron magnesium silicates resembling muscovite, i.e. mica or the clays, and which when subjected to heat, exfoliate as a function of the inter lamina generation of steam. The material is inert, chemically pure, non carcinogenic, free of asbestos, non corrosive, non combustible, non allergenic, odourless and harmless if swallowed. It has a melting point of 1 315° C., and a sinter temperature of 1 260° C. It has a thermal conductivity of K=0,062 to 0,065 w/m°C. It is used in particle sizes of from a screen analysis of 98 to 100% passing a 200 micron screen, through to a screen analysis of 90 to 98% retained on a 3 000 micron screen, with a bulk density of from 50 to 75 g/liter to 90 to 130 g/liter respectively. Typical suitable grades are MDX, SFX, FNX or Micron by Micronised Products Ltd. which is a subsidiary of Palabora Mining Company, South Africa.

In the first alternative of the invention, the vermiculite is chemically modified by impregnating the vermiculite with an impregnating composition comprising a dicarboxylic anhydride such as maleic anhydride, phthalic anhydride, succinic anhydride, or tetrahydrophthalic anhydride, or a tricarboxylic anhydride such as trimellitic anhydride, dissolved in a suitable solvent.

The choice of solvent is dictated by its suitability including toxicity, ease of handling, boiling point and evaporative rate, which in turn affect its ease of recovery from the vermiculite after impregnation, its inertness and therefore absence of interference chemically, flammability and danger of explosion, its solvency thereby propagating the infusion and intimate wetting of the vermiculite and finally its ease of recovery by absorption in activated carbon followed by steam purging and distillation, or condensation and refrigeration or membrane or sieve technologies. Examples of suitable solvents are methyl acetate, ethyl acetate, methylethyl ketone, benzene, trichloroethylene and dichloromethane. Dichloromethane is the preferred solvent, because it is non flammable, has a boiling point of approximately 39° Centigrade and is relatively inert, and meets the other requirements of the process. In addition dichloromethane has the propensity to absorb water as a solute forming a 98% azeotrope and thus further propagating the latency of the isocyanates which react with hydroxyl containing compounds, notably water, to produce urethanes. The high evaporative rate of dichloromethane also propagates the more rapid evaporation of residual water.

The impregnating composition includes an isocyanate thermosetting resin dissolved in a suitable compatible solvent.

Isocyanates are compounds containing the group—N=C=O and are characterised by the general formula:

$R(NCO)_x$.

wherein x is variable and denotes the number of NCO groups and R denotes a prepolymer group.

Examples of these isocyanates are those containing an (NCO) content percentage preferably exceeding 20%, more preferably exceeding 30%. These isocyanates promote latency or reduced reactivity and provide the maximum capacity for hydroxyl bonding. Examples are Desmadur VKS or Desmadur VK by Bayer, which are solvent free mixtures of aromatic polyisocyanates such as diphenyl methane-4,4 di-isocyanate and polymeric matter. These and similar are typically referred to as MDIs in the industry. A further description used is a di-isocyanato-diphenyl methane, further examples being Suprasec DNR-5005, which is a polymeric MDI, or Suprasec 2020 which is a monomeric MDI with available NCO percentages of 30,7% and 29% and which are polymeric MDI with standard functionality and monomeric MDI respectively. The Suprasec resins are supplied by ICI. A further example of a crude MDI is Voronate M 229 by Dow Chemical Company.

Further suitable di-isocyanates are the toluene di-isocyanates with the alternative names tolylene di-isocyanate or toluylene di-isocyanate with the abbreviation TDI, such as Desmadur L75 by Bayer.

The solvent may be any suitable solvent and is preferably dichloromethane, the isocyanate thermosetting resin being dissolved in the dichloromethane at a concentration of from 0,25% to 50% by weight, more preferably at a concentration of from 1 to 10% by weight of the impregnating composition.

Vermiculite being a natural alumino silicate, has layers of linked aluminium silicate tetrahedra, combined with layers of magnesium hydroxide and aluminium hydroxide. It is to hydroxyl groups in the clay lattice that the isocyanate groups and anhydrides cross-link, catalysed by the presence of the metallic hydroxides. It has been found, for example, that an exfoliated vermiculite board of a density of 0,4, bound with only 2% and 0,6% by weight on the vermiculite of "Supersec 5005" (ICI) MDI and maleic anhydride respectively has remarkable cohesive strength. Given the surface area of the fine exfoliated vermiculites, this would appear to substantiate the binder mechanism.

After the treatment of the vermiculite with the isocyanate thermosetting resin in the solvent, the solvent is recovered for reuse. The isocyanate thermosetting resin is left on and in the vermiculite in a latent condition ready for subsequent polymerisation when subjected to the appropriate condistions of heat and pressure.

The vermiculite may be impregnated with the impregnating composition by immersion, or by spraying, following which the solvent may be recovered for reuse.

A second alternative of the method of the invention is to apply to the particles an adhesion promoter to promote the adherence of a thermoplastic resin to the surfaces of the particles of vermiculite.

The adhesion promoter may be applied with or without a solvent therefor, and in any suitable manner such as for example by spraying or the like.

The adhesion promoter is preferably selected from the group consisting of:

convertible resins such as petroleum resins, hydrocarbon resins and coumarone indene resins. The petroleum resin, for example, may be derived from cracked oil C9 unsaturated monomers. The hydrocarbon resin may be an alkylated hydrocarbon resin or a hydroxy modified hydrocarbon resin; thermoplastic rubbers, e.g. Kraton D 1102CS by Shell;

styrene butadiene resins;

styrene acrylate resins;

chlorinated rubbers;

phenolic resins;

solvent soluble thermoplastic resins such as polystyrene or polyvinyl chloride;

lignocellulosic derived gums or rosins;

solvent swellable celluloses such as methylhydroxypropylcellulose, e.g. Culminal MHPC 2000S by Hercules Corporation;

phenol formaldehyde novolac resins, e.g. Plyophen 602N or Varcum 3337 by PRP Resins Division of Sentrachem Ltd;

bitumen, e.g. hard bitumen Mexphalte H80/90 by Shell; coal tar, asphalt or pitch;

urethane elastomers;

resinous tackifiers, e.g. Oulutac 20GPR by Forchem OY;

if necessary dissolved in a suitable non-aqueous solvent such as those listed for the anhydrides, preferably dichloromethane.

The adhesion promoter is applied to the particles in an amount of from 0,1% to 25% inclusive of the adhesion promoter by weight of the particles of vermiculite.

Either before or after application of the adhesion promoter there is applied to the particles a thermoplastic resin preferably in finally divided dry powder form, so that after the application of the adhesion promoter the thermoplastic resin adheres to the surfaces of the particles of vermiculite, the thermoplastic resin having been surface modified by irradiation or by fluorination.

Thus the thermoplastic resin may be mixed with the dry particles of vermiculite before application of the adhesion promoter. Then, when the adhesion promoter is applied, the thermoplastic resin adheres to the surfaces of the particles of vermiculite.

Alternatively, the thermoplastic resin may be applied to the particles of vermiculite after application of the adhesion promoter.

The thermoplastic resin may be an irradiated crosslinkable thermoplastic resin in dry powder form, preferably finely divided dry powder form, which resin has been subjected to gamma irradiation whilst in dry powder form, the resin being selected from the group consisting of polyvinyl chloride, linear low density polyethylene, low density polyethylene and high density polyethylene.

The dry powder thermoplastic resin may, for example, be a polyvinyl chloride, or a linear low density polyethylene, low density polyethylene or a high density polyethylene, which resin has been subjected to gamma irradiation at various absorbed dosages, typically in the range of from 5 to 30 kGy, preferably from 8 to 25 kGy, and preferably in oxygen or in an oxygenated atmosphere, irradiation being carried out at a typical dose rate of 1,38 Gy per second. It is to be noted that excessive dosing can result in the polymer being degraded.

The process of preirradiating these feed stock resins in fine particle size in bags is practical and relatively inexpensive. Further, radiation induced chemical changes in the chemical structure of the resins lead to remarkable physical changes in the resins, amongst which are improved cohesive strength and adhesion on conversion, when such radiation induced chemical changes occur before the conversion of the resins. Irradiation has a marked influence on the morphological characteristics of the resulting resins and their associated physical properties when used as binders in vermiculite composites. Radiation induced cross-linking takes place predominantly in the amorphous phase of the resins and results in an enhancement of the crystalline content of the final thermoplastic resins and which are induced to behave in a thermosetting manner, through the presence of irradiation induced grafting of reactive groups.

After the dry powder irradiated thermoplastic resin has adhered to the surface of the vermiculite any solvent used may be recovered for re-use, or otherwise removed. This leaves the vermiculite with a resinated surface which is dry and effectively in a latent condition, ready for processing to form a finished product.

The level of dry powder resination of the vermiculite is from 1% to 500% inclusive on a weight basis, depending upon the end application of the resulting product, but is more usually in the range of from 2% to 50% inclusive on a weight basis for a compression moulding process, e.g. for composite boards and in the range of from 50% to 500% inclusive on a weight basis for extruded and injection moulded products.

In addition, these irradiated thermoplastic resins in finely divided dry powder form may be ground with pigments and suitable extenders such as carbonates, talcs or kaolins, and laid up as a dry outer horizon or as a pre-pigmented film on one or both outer surfaces of a vermiculite core during the manufacture of a board, so providing for decorative surfaces.

The thermoplastic resin may also be a thermoplastic resin in dry powder form, preferably in finely divided dry powder form, which has been fluorinated, the resin being selected from the group consisting of polyvinylchloride, polyethylene and polypropylene.

The resin in finely divided powder form or in very high aspect ratio fibre form, or in thin flake form, is treated with fluorine gas, which because it is such a strong oxidising agent may be diluted with another gas up to 99% by volume. The resin particles may be first subjected to a vacuum before the introduction of the fluorine gas which may be diluted with nitrogen or oxygen or other gas, and under pressure. After sufficient period of contact the fluorine is once again removed and purged by vacuum in order to reduce the free fluorine level to the order of 0,1 parts per million in the entrained air, or lower.

The thermoplastic resin is selected from the group consisting of polyvinyl chloride, polyethylene or polypropylene, polypropylene being the preferable polymer, which has been fluorinated and which adheres to the surface of the vermiculite.

Fluorination induced chemical changes in the chemical structure of the resins leads to physical changes in the resins, amongst which are improved cohesive strength and adhesion on conversion when such fluorination induced chemical changes occur before the conversion of the resin. Fluorination has an influence on the morphological characteristics of the resins and their associated physical properties when used as binders in vermiculite composites in which they may be induced to behave in a thermosetting rather than a purely thermoplastic manner, through the presence of fluorination induced grafting of reactive groups.

After the dry powder, fibre or flake of fluorinated thermoplastic resin has adhered to the surface of the vermiculite, any solvent used may be recovered for re-use or otherwise removed. This leaves the vermiculite with a resinated surface which is dry and which is effectively in a latent condition, because the activation of the fluorinated binder resin is only achieved on subjection to the necessary conditions of temperature and pressure as is described hereinafter.

The level of resination of the vermiculite is from 1% to 500% inclusive on a weight basis depending upon the end application of the resulting product, but is more usually in the range of from 2 to 50% inclusive on a weight basis, for a compression moulding process, e.g. for composite boards and in the range of from 50% to 500% inclusive on a weight basis for extruded and injection moulded products.

In addition, these fluorinated thermoplastic resins in finely divided dry powder or flake or fibre form, or in film form may be pre-pigmented for laying up as a dry outer horizon or as a pre-pigmented film on one or both outer surfaces of the vermiculite composite core, during the manufacture of a board, so providing for decorative surfaces. In addition outer laminating films may be used which in themselves are laminates, the inner laminate only having been fluorinated.

As a further alternative, the adhesion promoter may be applied to the particles of thermoplastic resin before step (c) (i).

The resination of the particles is designed to bind the particles to one another to form a composite product or an extruded product or the like.

A third alternative of the method of the invention is to apply to the particles an adhesion promoter which is a solvent, to promote the adherence of a dry powder novolac resin to the surfaces of the particles of vermiculite. Again the adhesion promoter may be applied before or after application of the dry powder novolac resin to the particles of vermiculite.

Thus the novolac resin may be mixed with the dry particles of vermiculite before application of the adhesion promoter. Then, when the adhesion promotor is applied, the novolac resin adheres to the surfaces of the particles of vermiculite.

Alternatively, the novolac resin may be applied to the particles of vermiculite after application of the adhesion promoter.

The solvent may be selected from water and dichloromethane.

A novolac resin is a resin based upon phenol and formaldehyde and any of the variations and modified forms of such a resin, where the molar ratio of phenol to formaldehyde exceeds parity. The novolac resin may contain a catalyst, which on decomposition with heat gives rise to a source of formaldehyde, inducing the condensation of the polymer to form a three dimensional stable network with minimal shrinkage and which is hard, strong and insoluble. The resin is used in finely divided powder form and has the property of commencing to flow at approximately 100° to 130° C., generally around 110° C., followed by the decomposition of the catalyst, for example, hexamethylene tetramine. Example of suitable novolac resins are Schenectady Corporation of South Africa codes 6240 or 3174, or Plyophen 24-700 and Plyophen 602N or Varcum 3337 of PRP Resins Division of Sentrachem Ltd of South Africa.

After the dry powder novolac thermosetting resin has adhered to the surface of the vermiculite, the solvent adhesion promoter may be recovered for reuse or otherwise removed. This leaves the vermiculite with a resinated surface which is dry and in a latent condition, ready for processing to form a finished product.

In addition, the particles of vermiculite may be mixed with a suitable amount of cryogenically ground crumb rubber particles, such as those recovered from automobile tires, in the range of particle sizes from 0,25 mm to 3 mm, to improve the resilience, shock resistance, nail holding ability and flexibility of the finished product made therefrom.

Examples of the invention will now be given.

EXAMPLE 1

There is formed an impregnation mixture comprising a 1% phthalic anhydride and a 3% Suprasec 5005 MDI (by ICI) solution in dichloromethane.

Exfoliated vermiculite particles are impregnated with the impregnation mixture so that the particles absorb up to 150% of the impregnation mixture, after drainage.

Thereafter the solvent, dichloromethane, is recaptured for reuse.

The treated particles are placed between the platens of a press and pressed into a board at a temperature of about 210° C. for about 5 minutes to produce a particle board having a density of 0,34 g/cm$^3$.

EXAMPLE 2

There is formed an impregnation mixture comprising 10 kg of dichloromethane, 400 g of methanol, 40 g of Culminal MHPC 2000S by Hercules Corporation. The impregnation mixture is left to stand for not less than 40 minutes to allow the cellulose to swell.

Exfoliated vermiculite particles are impregnated with the impregnation mixture and are thereafter drained.

The treated vermiculite particles are then mixed with 12% by weight of a linear low density irradiated polyethylene of 300 mesh particle size, which has been irradiated at an absorbed dose of 16 kGy, so that the polyethylene particles adhere to the vermiculite particles.

Thereafter, the solvent, dichloromethane is recaptured for reuse.

The particles are pressed between the platens of a press at about 220° C. for about 6 minutes to produce a board having a density of 0,93 g/cm$^3$.

EXAMPLE 3

There is formed an impregnation mixture comprising a 1% solution of maleic anhydride in dichloromethane.

Exfoliated vermiculite particles are sprayed with the impregnation mixture so that the impregnation mixture is absorbed.

While the vermiculite particles are still damp, 10% by weight of the vermiculite of Varcum 3337 novolac resin at an average particle size of 250 mesh, is added to the vermiculite particles and the particles are mixed so that the novolac resin particles adhere to the vermiculite particles.

Thereafter the solvent, dichloromethane, is recaptured for reuse.

The particles are pressed between the platens of a press at about 190° C. for about 4 minutes to produce a board having a thickness of 12 mm and a density of 0,6 g/cm$^3$.

The second aspect of the invention is a process of making a article from particles of an exfoliated vermiculite treated by steps (a), (b), (c) and (d) above, which process includes the step of compressing the particles of vermiculite with heating in a suitable press or mould to allow the resin present to polymerise to form the article.

For example the particles of the vermiculite may be compressed and heated in a suitable press at temperatures between 120° C. and 250° C., preferably in the range of from 150° C. to 220° C., and at pressures of from 2 to 70 kg/cm$^2$, preferably about 18 to 30 kg/cm$^2$.

The third aspect of the invention is the process described above but for making a particle board from particles of an exfoliated vermiculite, which is modified by the inclusion in the particle board of one or more sheets of a lignocellulosic material impregnated with a particular composition. In this way, the impregnated sheet or sheets of lignocellulosic material are incorporated into one or both the outer horizons of the particle board thereby providing a stressed skin composite with a surface to which finishes can be applied.

The sheet or sheets of a lignocellulosic material may be sheets of paper, preferably kraft paper, pulp in sheet form, wood veneer, or sheets of any other suitable lignocellulosic material.

The sheet or sheets of lignocellulosic material are impregnated with a composition comprising a thermosetting resin, an extending liquid for the thermosetting resin, and where necessary a catalyst for the thermosetting resin.

Examples of suitable compositions for impregnation are disclosed in South African Patent No 90/2260 to Plascon Technologies (Proprietary) Limited and are set out in more detail below.

It is desirable that the thermosetting resin has an extended pot life, i.e. the period of time during which no significant viscosity change occurs in the resin mix. A pot life of at least fourteen to twenty five weeks is desirable. This may be achieved by suitable selection of thermosetting resin and the extending liquid and where present the catalyst. The thermosetting resin may also be kept at a low temperature, for example below 10° C. to extend the pot life.

The extending liquid has other important functions which are to provide variability as to the weight of resin to be impregnated into the sheets, to control resin viscosity, not to interfere with polymerisation, to be easily recovered from the impregnated material and to be easily handled without danger of toxicity, explosion or fire.

The thermosetting resin may be a phenolic resin (phenol formaldehyde resole resin), preferably a liquid phenolic resin, which can be polymerised at room or elevated temperatures. Examples of suitable phenolic resins include Celobond J 2027 L, J 2018, J 20/1096 L and J 20/1081 L from British Petroleum Company Plc, which may be catalysed with a catalyst such as Phencat 10 or more preferably latent catalyst Phencat P.R.P 382 from British Petroleum Plc. A phenol furfuryl resin catalysed with hexamethylenetetramine, or a blend of a phenolic resin with melamine formaldehyde or urea formaldehyde resins are also choices.

Suitable extending liquids for use with phenolic resins may be either solvents for the resin or low viscosity diluents, and may be either reactive or non reactive. Typical examples include water, C1 to C4 alcohols such as methanol or ethanol, higher carbon alcohols such as furfuryl alcohol, acetone or methyl ethyl ketone, or blends between them.

Other particularly suitable thermosetting resins are the MDI and TDI isocyanates which may be used without polyol or usual cross-linking components, because they link with the hydroxyl groups in the cellulose and hemicellulose of the lignocellulosic sheets of materials. An example of a suitable polyurethane pre-cursor of this type is Desmodur VK or Desmodur VKS by Bayer.

Suitable extending liquids for use with isocyanates are the halogenated hydrocarbons such as dichloromethane or trichloroethylene, or ethyl acetate. No catalyst is necessary.

Another type of thermosetting resin which may be used are the liquid room temperature curing acrylic and methacrylic acid esters and methyl methacrylates, typically catalysed with benzoyl peroxide powders. Further types are the urea formaldehydes, melamine formaldehyde resins, catalysed either with acids or alkalis, and which may have been internally plasticised with glycols.

The composition may also include other components such as an inhibitor, an accelerator or a surfactant, a fire retardant or a plasticiser.

There are two particularly preferred compositions for the use in this invention. These compositions are preferred because they have optimum pot life, they provide for suitable levels of impregnation of the resin into the sheet materials to be impregnated, they provide for easy polymerisation of the thermosetting resin once impregnated, and the extending liquid is easily recovered.

The first preferred liquid composition comprises a phenolic resin, 30% to 400% by weight of the phenolic resin of an extending liquid which is chosen from a C1 to C4 alcohol, preferably methanol, which imposes latency, but which may have blended with it another solvent to increase evaporative rate, and a catalyst for the phenolic resin, such as Phencat 10 or a latent catalyst such as P.R.P 382 BY British Petroleum Plc or its equivalent.

The second preferred liquid composition comprises an isocyanate, preferably a MDI or TDI isocyanate, in which no catalyst inclusion is necessary, 20% to 350% by weight of the resin of an extending liquid which is selected from dichoromethane, trichloroethylene, ethyl acetate, methyl acetate or other suitable extending liquids, preferably dichloromethane, and an anhydride. The methyl or ethyl isocyanates esterify with the hydroxyl groups in the cellulose and hemi-cellulose molecules of the pulp or paper or wood veneer or other natural fibre or lignocellulosic material and in themselves form polyurea polymer structures imposing good mechanical properties on the material treated.

The sheets of lignocellulosic materials may be impregnated with the liquid composition in any suitable manner. Immersion or impregnation by vacuum/pressure/vacuum impregnation in a suitable pressure cylinder or examples. Thereafter the impregnated sheets are passed to the next step of the process.

In the next step of the process, the extending liquid present in the impregnated sheets is recovered for re-use by evaporation and subsequent recondensation, or absorption.

In the next step of the process, the impregnated sheets of lignocellulosic material are positioned either at the bottom or top or on both bottom and top of a layer of the vermiculite particles to form a composite and the composite is then pressed under suitable conditions of temperature and pressure between the platens of a press, on either a continuous or discontinuous basis, whereupon the thermosetting resin in the impregnated sheets is polymerised, the resin in the vermiculite polymerises, and all set to form the particle board with the outer impregnated sheets firmly adhered to the core of the composite. These lend themselves to powder coating immediately the board exits the press and is at the requisite temperature.

After steps (a) to (d) of the methods described above, the particles of an exfoliated vermiculite so treated may be made up into a particle board or other article by compressing the particles of vermiculite with heating in a suitable press or mould. It has been found that the particles of vermiculite may be further treated before they are compressed in a press or mould, by wetting of the particles of vermiculite with a solution of a natural latex or thermoplastic rubber or other tacky or sticky soluble compound, and then evaporating off the solvent, which may be water in the case of natural latex, or an acrylic pressure sensitive adhesive.

The result of this is that the particles of the vermiculite, either in the outer horizon or optionally throughout the depth thereof, are stuck together by the thermoplastic rubber or other tacky or sticky compound, to provide a flexible sheet. This flexible sheet may then be compressed with heating in a suitable press or mould as is described above.

The thermoplastic rubber may be any of those listed above, and the solvent may be any suitable solvent such as dichloromethane. Alternatively a natural latex in water may be used.

The solution of the thermoplastic rubber or other sticky or tacky compound may be applied to the particles of the vermiculite by spraying. Thereafter the particles may be subjected to a moderate pressure, before or after removal of the solvent.

The advantage of the product produced by this step is that the flexible sheet may be placed in a press or mould which has a shaped surface, for example a corrugated or curved surface, without particle displacement which would result in undue thickness variations in the final product. When the flexible sheet is pressed at appropriate temperatures and pressures, it first conforms to shape of the press or mould, is then compressed and then the irreversible binding takes place to form a suitably shaped component. The resulting component is water resistant, has good mechanical properties, retains its shape, has no binder related toxic volatiles and is cost effective.

The fourth aspect of the invention is a process of making an article from particles of an exfoliated vermiculite treated by steps (a), (b), (c) and (d) above, by conventional extrusion or injection moulding techniques.

The treated particles of vermiculite may also be combined with a suitable amount of lignocellulosic particles or with reinforcing fibres such as glass fibre or synthetic organic fibres, before manufacture of the finished product.

The various methods disclosed above and the products produced by these methods have various advantages which are set out below:

1. After the chemical treatment and resination of the particles, and the recovery of the solvent for re-use, the particles are in the latent condition allowing the pressing operation in making up the board to be carried out at a different place and at a different time. This allows for discontinuous production and results in the further advantage of minimising capital investment costs per unit of product produced, as well as greater marketing flexibility, i.e. selling the pre-manufactured board or the beneficiated vermiculite only for board pressing by the customer.

2. The avoidance of binder related toxic volatiles, the minimisation of bulking on contact with water, the imposition of good mechanical properties and of good surface integrity are achieved.

3. The entire composite is pressed from dry constituents which allows for a much wider choice of specification such as outer horizon make up, internal binder combinations and percentage levels, core constituent additives such as fibres or outer laminate choice, and product shape and forming method.

I claim:

1. A method of preparing particles of an exfoliated vermiculite for the manufacture of a finished product comprising the steps of:

(a) if necessary chemically modifying the vermiculite by impregnating the vermiculite with an impregnating composition comprising a dicarboxylic anhydride or a tricarboxylic anhydride dissolved in a suitable non-aqueous solvent;

(b) if necessary applying to the particles an adhesion promoter to promote the adherence of a resin to the surfaces of the particles of vermiculite;

(c) resinating the particles of vermiculite by either:
    (i) applying to the particles a thermoplastic resin in dry powder form, so that after the application of the adhesion promoter, the thermoplastic resin adheres to the surfaces of the particles of vermiculite, the thermoplastic resin having been surface modified by irradiation or by fluorination; or (ii) including in the impregnating composition of step (a) an isocyanate thermosetting resin dissolved in a solvent; or (iii) applying to the particles a dry powder novolac thermosetting resin and if necessary a catalyst therefor so that after the application of the adhesion promoter, the dry powder novolac thermosetting resin adheres to the surfaces of the particles of vermiculite; and (d) if necessary after step (c), removing any solvent present.

2. A method according to claim 1 which includes the steps of:

(a) chemically modifying the vermiculite by impregnating the vermiculite with an impregnating composition comprising a dicarboxylic anhydride or a tricarboxylic anhydride dissolved in a non-aqueous solvent;

(c) (ii) resinating the particles of vermiculite by including in the impregnating composition of step (a) an isocyanate thermosetting resin dissolved in a suitable compatible solvent; and (d) after step (c) (ii), removing the solvent.

3. A method according to claim 1 or 2 wherein the anhydride is selected from the group consisting of maleic anhydride, phthalic anhydride, succinic anhydride, tetrahydrophthalic anhydride and trimellitic anhydride.

4. A method according to claim 1 or 2 wherein the solvent for the anhydride is selected from the group consisting of methyl acetate, ethyl acetate, methyl ethyl ketone, benzene, trichloroethylene and dichloromethane.

5. A method according to claim 4 wherein the solvent for the anhydride is dichloromethane.

6. A method according to claim 2 wherein the impregnating composition contains from 0.25% to 20% inclusive of the anhydride by weight of the impregnating composition.

7. A method according to claim 2 wherein the solvent for the isocyanate thermosetting resin is the same as the solvent for the impregnating composition.

8. A method according to claim 2 wherein the impregnating composition consists the isocyanate thermosetting resin in an amount of from 0,25% to 50% inclusive of the isocyanate thermosetting resin by weight of the impregnating composition.

9. A method according to claim 1 which includes the steps of:

(b) applying to the particles an adhesion promoter to promote the adherence of a resin to the surfaces of the particles of vermiculite;

(c) (i) applying to the particles a thermoplastic resin in dry powder form, so that after the application of the adhesion promoter, the thermoplastic adheres to the surfaces of the particles of vermiculite, the thermoplastic resin having been surface modified by irradiation or by fluorination; and (d) if necessary after step (c), removing any solvent present.

10. A method according to claim 1 or claim 9 wherein the adhesion promoter is selected from the group consisting of petroleum resins, hydrocarbon resins, coumarone indene resins, thermoplastic rubbers, styrene butadiene resins, styrene acrylate resins, chlorinated rubbers, phenolic resins, solvent soluble thermoplastic resins, lignocellulosic derived gums or rosins, solvent swellable celluloses, phenol formaldehyde novolac resins, urethane elastomers, resinous tackifiers, bitumen, coal tar, asphalt, and pitch.

11. A method according to claim 1 or claim 9 wherein the adhesion promoter is applied to the particles in an amount of from 0,1% to 25% inclusive of the adhesion promoter by weight of the particles of vermiculite.

12. A method according to claim 1 or claim 9 wherein the thermoplastic resin comprises an irradiated cross-linkable thermoplastic resin in dry powder form, which resin has been subjected to gamma irradiation whilst in dry powder form, the resin being selected from the group consisting of polyvinyl chloride, linear low density polyethylene, low density polyethylene and high density polyethylene.

13. A method according to claim 1 or claim 9 wherein the thermoplastic resin comprises a thermoplastic resin in dry powder form which has been fluorinated, the resin being selected from the group consisting of polyvinyl chloride, polyethylene and polypropylene.

14. A method according to claim 1 or claim 9 wherein in step (c) (i) the particles of vermiculite are resinated with from 1% to 500% inclusive of the thermoplastic resin by weight of the vermiculite.

15. A method according to claim 1 which includes the steps of:

(b) applying to the particles an adhesion promoter which comprises a solvent which wets the particles of vermiculite and which causes adherence of a resin to the surfaces of the particles of vermiculite, (c) (iii) applying to the particles a dry powder novolac thermosetting resin and if necessary a catalyst therefor so that after the application of the adhesion promoter, the dry powder novolac thermosetting resin adheres to the surfaces of the particles of vermiculite and (d) after step (c) removing the solvent.

16. A method according to claim 15 wherein the solvent is selected from the group consisting of water and dichloromethane.

17. A process of making an article from particles of an exfoliated vermiculite prepared according to the method of claim 1, which process includes the step of:

compressing the particles of vermiculite with heating in a suitable press or mould to allow the resin present to polymerise to form the article.

18. A process according to claim 17 wherein the particles of vermiculite are compressed and heated in a press or mould at a temperature between 120° C. and 250° C. inclusive and at a pressure of from 2 to 70 kg/cm² inclusive.

19. A process of making a particle board from particles of an exfoliated vermiculite prepared according to the method of claim 1, which process includes the steps of:

(i) impregnating a sheet or sheets of a lignocellulosic material with a composition comprising a thermosetting resin, an extending liquid for the thermosetting resin and where necessary a catalyst for the thermosetting resin;

(ii) recovering the extending liquid;

(iii) placing on one or both sides of a layer of the particles of vermiculite, the impregnated sheet or sheets of lignocellulosic material to form a composite; and (iv) compressing the composite with heating in a suitable press to allow the resin present to polymerise, and to allow the thermosetting resin in the impregnated sheet or sheets to polymerise and to bond, and all to set to form the particle board.

20. A process according to claim 19 wherein in step (iv) the composite is compressed and heated in a suitable press at a temperature between 120° C. and 250° C. inclusive and at a pressure of 2 to 70 kg/cm² inclusive.

21. A process of making an article from particles of an exfoliated vermiculite treated according to the method of claim 1, which process includes the step of:

subjecting the particles of vermiculite to an extrusion or injection moulding process with heating to allow the resin present to polymerise to form the article.

* * * * *

UNITED STATES PATENT AND TRADEMARK OFFICE
CERTIFICATE OF CORRECTION

PATENT NO. : 5,879,600  Page 1 of 1
DATED : March 9, 1999
INVENTOR(S) : Michael Windsor Symons It is certified that error appears in the above-identified patent and that said Letters Patent is hereby corrected as shown below:

<u>Title page,</u>
Item [22], deleting "Filed: Jul 28, 1997", and inserting -- PCT filed: Oct. 31,

Item -- [86]   PCT No.:   PCT/GB95/02549
               §371 Date:   Jul. 28, 1997
               §102(e) Date:   Jul. 28, 1997 --;

inserting -- [87]   PCT Pub. No.:   WO96/13468
                    PCT Pub. Date:   May 9, 1996 --; and Item [30], changing the filing date of South Africa 94/9910 from "Dec. 13, 1995" to -- Dec. 13, 1994 --.

Signed and Sealed this

Eleventh Day of June, 2002

Attest:

Attesting Officer

JAMES E. ROGAN
*Director of the United States Patent and Trademark Office*